(12) United States Patent
Vassilieva et al.

(10) Patent No.: US 9,197,323 B2
(45) Date of Patent: Nov. 24, 2015

(54) ASYMMETRIC COMPENSATION OF POLARIZATION DEPENDENT LOSS IN DUAL-POLARIZATION OPTICAL SYSTEMS

(71) Applicant: Fujitsu Limited, Kawasaki-shi, Kanagawa (JP)

(72) Inventors: Olga Vassilieva, Plano, TX (US); Inwoong Kim, Allen, TX (US); Jeng-Yuan Yang, Garland, TX (US); Motoyoshi Sekiya, Richardson, TX (US)

(73) Assignee: Fujitsu Limited, Kawasaki-shi (JP)

( * ) Notice: Subject to any disclaimer, the term of this patent is extended or adjusted under 35 U.S.C. 154(b) by 107 days.

(21) Appl. No.: 13/920,785

(22) Filed: Jun. 18, 2013

(65) Prior Publication Data
US 2014/0369679 A1    Dec. 18, 2014

(51) Int. Cl.
*H04B 10/08* (2006.01)
*H04B 10/2507* (2013.01)

(52) U.S. Cl.
CPC .................................. *H04B 10/2572* (2013.01)

(58) Field of Classification Search
CPC ........... H04B 10/2525; H04B 10/2569; H04B 10/2572; H04B 10/0795; H04B 10/27
USPC ........................................ 398/25–27, 65, 152
See application file for complete search history.

(56) References Cited

U.S. PATENT DOCUMENTS

| | | | | |
|---|---|---|---|---|
| 5,311,346 | A * | 5/1994 | Haas et al. ..................... | 398/146 |
| 2009/0087194 | A1 * | 4/2009 | Nakashima et al. .......... | 398/158 |
| 2010/0322622 | A1 | 12/2010 | Shukunami et al. | |
| 2011/0243557 | A1 * | 10/2011 | Croussore et al. ............. | 398/45 |
| 2011/0249981 | A1 * | 10/2011 | Deczky et al. ................. | 398/208 |
| 2012/0219285 | A1 * | 8/2012 | Dahan et al. ................... | 398/26 |
| 2013/0142507 | A1 * | 6/2013 | Mandai et al. ................. | 398/25 |

FOREIGN PATENT DOCUMENTS

EP    1936841    6/2008    ............. H04B 10/08

OTHER PUBLICATIONS

Vassilieva et al.; "Statistical Analysis of the Interplay between Nonlinear and PDL Effects in Coherent Polarization Multiplexed Systems"; ECOC Technical Digest; pp. 3, 2012.
Kakande et al.; "QPSK Phase and Aptitude Regeneration at 56 gbaud in a Novel Idler-Free Non-Degenerate Phase Sensitive Amplifier"; Optical Society of America; pp. 3, 2011.
Kakande et al.; "All-Optical Processing of Multi-level Phase Shift Keyed Signals"; Optical Society of America; OFC/NFOEC Technical Digest; pp. 3, 2012.
Parmigiani et al.; "All-Optical phase regeration of 40Gbit/s DPSK signals in a black-box phase sensitive amplifier"; Optical Society of America; pp. 3, 2010.

(Continued)

*Primary Examiner* — Dzung Tran
(74) *Attorney, Agent, or Firm* — Baker Botts L.L.P.

(57) ABSTRACT

Methods and systems for asymmetrically compensating degradation of an optical signal-to-noise ratio (OSNR) induced by polarization dependent loss (PDL) in dual-polarization optical system include using an OSNR compensator. The OSNR compensator may separate the dual-polarization components and determine which component has degraded OSNR. The degraded component may be OSNR compensated using a phase-sensitive amplifier and/or a regenerator with a phase-sensitive amplifier.

21 Claims, 15 Drawing Sheets

(56) References Cited

OTHER PUBLICATIONS

Tang et al.; "Analysis of phase regeneration of DPSK/DQPSK signals based on phase-sensitive amplification"; Chinese Optics Letters, vol. 7, No. 5; pp. 4, May 10, 2009.

Croussore et al.; "Deonstration of phase-regeneration of DPSK signals based on phase-sensitive amplification"; Optics Express, vol. 13, No. 11; pp. 6; May 30, 2005.

Kakande; "Phase Sensitive Parametric Amplifiers and Their Applications"; University of Southampton; pp. 165, 2012.

Andrekson et al.; "Phase-Sensitive Fiber-Optic Parametric Amplifiers and Their Applications"; ECOC; pp. 6, 2010.

Croussore et al.; "All-optical regeneration of differential phase-shift keying signals based on phase-sensitive amplification"; Optics Letters, vol. 29, No. 20; pp. 3, Oct. 15, 2004.

* cited by examiner

ASYMMETRIC COMPENSATION OF POLARIZATION DEPENDENT LOSS IN DUAL-POLARIZATION OPTICAL SYSTEMS

BACKGROUND

1. Field of the Disclosure

The present disclosure relates generally to optical communication networks and, more particularly, to a system and method for asymmetrically compensating signal degradation induced by polarization dependent loss (PDL) in dual-polarization optical systems.

2. Description of the Related Art

Telecommunications systems, cable television systems and data communication networks use optical networks to rapidly convey large amounts of information between remote points. In an optical network, information is conveyed in the form of optical signals through optical fibers. Optical networks may also include various network elements, such as amplifiers, dispersion compensators, multiplexer/demultiplexer filters, wavelength selective switches, couplers, etc. configured to perform various operations within the network.

However, each of these network subsystems may also introduce polarization dependent effects on the optical signals traveling through the network. These effects may cause the different polarization components of the optical signals to experience different signal degradation due to polarization dependent loss (PDL). For example, PDL may cause an imbalance in the optical signal-to-noise ratio (OSNR) between polarization of the optical signal, such that one polarization component exhibits a degraded OSNR at a receiver compared to another polarization component. Furthermore, depending on the symbols transmitted, cross talk among polarization components due to PDL may result in intensity variations that are observed as nonlinear phase noise.

SUMMARY

In one aspect, a disclosed method for compensating optical signal-to-noise ratio (OSNR) degradation in an optical network includes receiving an optical signal having X- and Y-polarization components, rotating a polarization axis of the optical signal to a desired value, and separating the X- and Y-polarization components into an X-polarization optical signal transmission path and a Y-polarization optical signal transmission path. The method may also include determining a degraded polarization component selected from the X-polarization component and the Y-polarization component based on degradation of an optical signal-to-noise ratio induced by polarization dependent loss, and restoring an optical signal-to-noise ratio of the degraded polarization component Additional disclosed aspects for compensating optical signal-to-noise ratio degradation in an optical network include an OSNR compensator and an optical communication system, as described herein.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
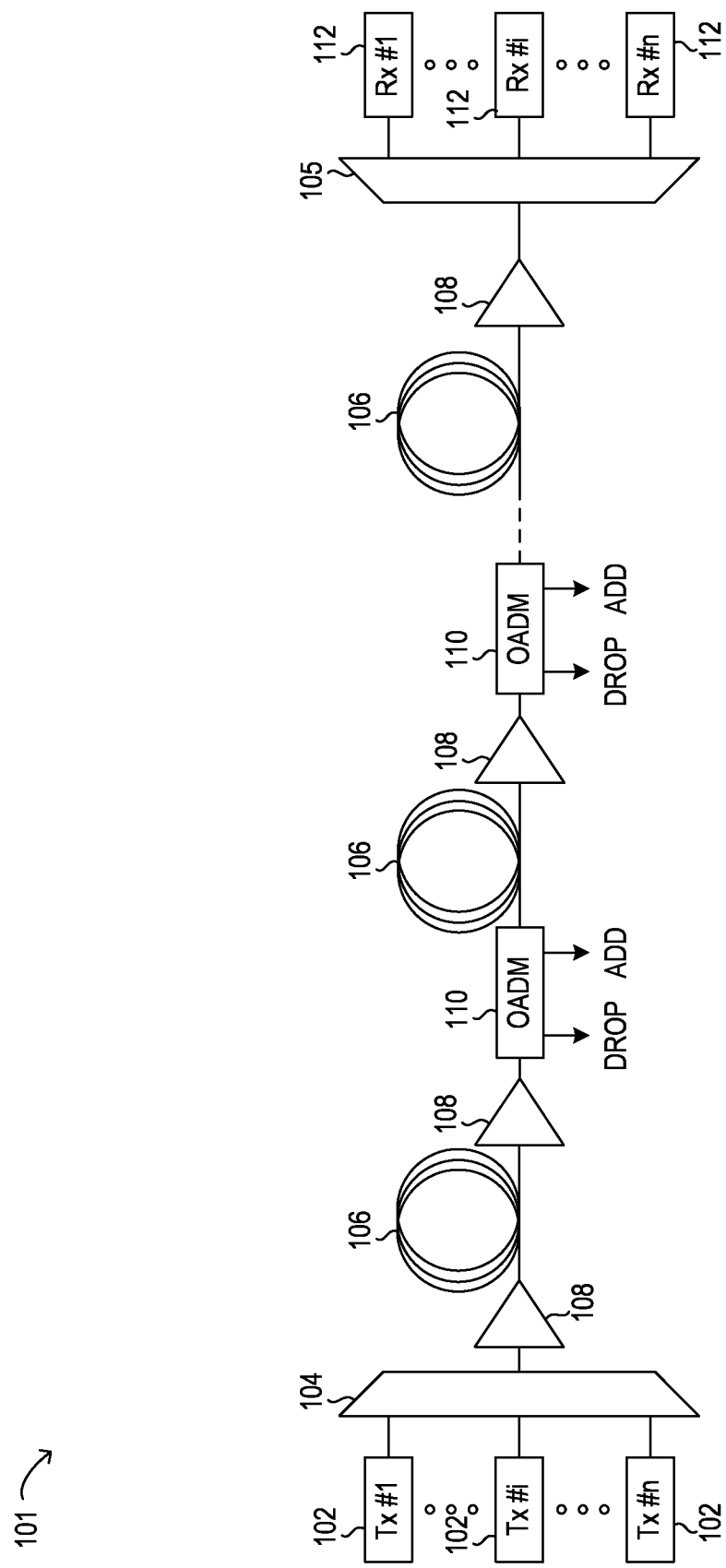
FIG. 1 is a block diagram of selected elements of an embodiment of an optical network.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Turning now to the drawings, FIG. 1 illustrates an example embodiment of optical transmission network 101. Optical transmission network 101 may include one or more optical fibers 106 configured to transport one or more optical signals communicated by components of optical network 101. The network elements of optical network 101, coupled together by fibers 106, may comprise one or more transmitters 102, one or more multiplexers (MUX) 104, one or more amplifiers 108, one or more optical add/drop multiplexers (OADM) 110, and one or more receivers 112.

Optical network 101 may comprise a point-to-point optical network with terminal nodes, a ring optical network, a mesh optical network, or any other suitable optical network or combination of optical networks. Optical fibers 106 comprise thin strands of glass capable of communicating the signals over long distances with very low loss. Optical fibers 106 may comprise any suitable type of fiber.

Optical network 101 may include devices configured to transmit optical signals over fibers 106. Information may be transmitted and received through network 101 by modulation of one or more wavelengths of light to encode the information on the wavelength. In optical networking, a wavelength of light may also be referred to as a channel. Each channel may be configured to carry a certain amount of information through optical network 101.

To increase the information carrying capabilities of optical network 101, multiple signals transmitted at multiple channels may be combined into a single optical signal. The process of communicating information at multiple channels of a single optical signal is referred to in optics as wavelength division multiplexing (WDM). Dense wavelength division multiplexing (DWDM) refers to the multiplexing of a larger (denser) number of wavelengths, usually greater than forty, into a fiber. WDM, DWDM, or other multi-wavelength transmission techniques are employed in optical networks to increase the aggregate bandwidth per optical fiber. Without WDM or DWDM, the bandwidth in optical networks may be limited to the bit-rate of solely one wavelength. With more bandwidth, optical networks are capable of transmitting greater amounts of information. Optical network 101 may be configured to transmit disparate channels using WDM, DWDM, or some other suitable multi-channel multiplexing technique, and to amplify the multi-channel signal.

Optical network 101 may include one or more optical transmitters (Tx) 102 configured to transmit optical signals through optical network 101 in specific wavelengths or channels. Transmitters 102 may comprise any system, apparatus or device configured to convert an electrical signal into an optical signal and transmit the optical signal. For example, transmitters 102 may each comprise a laser and a modulator configured to receive electrical signals and modulate the information contained in the electrical signals onto a beam of light produced by the laser at a particular wavelength and transmit the beam carrying the signal throughout the network.

Multiplexer 104 may be coupled to transmitters 102 and may be any system, apparatus or device configured to combine the signals transmitted by transmitters 102, in individual wavelengths, into a single WDM or DWDM signal.

Amplifiers 108 may amplify the multi-channeled signals within network 101. Amplifiers 108 may be positioned before and/or after certain lengths of fiber 106. Amplifiers 108 may comprise any system, apparatus, or device configured to amplify signals. For example, amplifiers 108 may comprise an optical repeater that amplifies the optical signal. This amplification may be performed with opto-electrical or electro-optical conversion. In some embodiments, amplifiers 108 may comprise an optical fiber doped with a rare-earth element. When a signal passes through the fiber, external energy may be applied to excite the atoms of the doped portion of the optical fiber, which increases the intensity of the optical signal. As an example, amplifiers 108 may comprise an erbium-doped fiber amplifier (EDFA).

OADMs 110 may be coupled to network 101 via fibers 106 also. OADMs 110 comprise an add/drop module, which may include any system, apparatus or device configured to add and/or drop optical signals from fibers 106. After passing through an OADM 110, a signal may travel along fibers 106 directly to a destination, or the signal may be passed through one or more additional OADMs 110 before reaching a destination.

Network 101 may also include one or more demultiplexers 105 at one or more destinations of network 101. Demultiplexer 105 may comprise any system apparatus or device that may act as a demultiplexer by splitting a single WDM signal into its individual channels. For example, network 101 may transmit and carry a forty channel DWDM signal. Demultiplexer 105 may divide the single, forty channel DWDM signal into forty separate signals according to the forty different channels.

In certain embodiments of network 101, OADM 110 may represent a reconfigurable OADM (ROADM) that is capable of adding or dropping individual or multiple wavelengths of a WDM signal carrying data channels to be added or dropped in the optical domain, for example, using a wavelength selective switch (WSS).

Network 101 may also include receivers 112 coupled to demultiplexer 105. Each receiver 112 may be configured to receive signals transmitted in a particular wavelength or channel, and process the signals for the information that they contain. Accordingly, network 101 may include at least one receiver 112 for every channel of the network.

Optical networks, such as network 101, may further employ modulation schemes to convey information in the optical signals over the optical fibers. Such modulation schemes may include phase-shift keying ("PSK"), frequency-shift keying ("FSK"), amplitude-shift keying ("ASK"), and quadrature amplitude modulation ("QAM").

In PSK, the information carried by the optical signal may be conveyed by modulating the phase of a reference signal, also known as a carrier wave, or simple, a carrier. The information may be conveyed by modulating the phase of the signal itself using differential phase-shift keying ("DPSK"). In QAM, the information carried by the optical signal may be conveyed by modulating both the amplitude and phase of the carrier wave. PSK may be considered a subset of QAM, wherein the amplitude of the carrier waves is maintained as a constant.

In an optical communications network, such as network 101, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, and/or an operational support system (OSS) which handles network-wide operations.

Modifications, additions or omissions may be made to network 101 without departing from the scope of the disclosure. For example, network 101 may include more or fewer elements than those depicted. Additionally network 101 may include additional elements not expressly shown, such as a dispersion compensation module. Also, as mentioned above, although depicted as a point-to-point network, network 101 may comprise any suitable network for transmitting optical signals such as a ring or mesh network.

As discussed above, the amount of information that may be transmitted over an optical network may vary with the number of optical channels coded with information and multiplexed into one signal. Accordingly, an optical signal employing WDM may carry more information than an optical signal carrying information over solely one channel. An optical signal employing DWDM may carry even more information. Besides the number of channels carried, another factor that affects how much information can be transmitted over an optical network may be the bit rate of transmission. The greater the bit rate, the more information may be transmitted.

Polarization division multiplexing (PDM) technology may enable achieving a greater bit rate for information transmission. PDM transmission comprises modulating information onto various polarization components of an optical signal associated with a channel. The polarization of an optical signal may refer to the direction of the oscillations of the optical signal. The term "polarization" may generally refer to the path traced out by the tip of the electric field vector at a point in space, which is perpendicular to the propagation direction of the optical signal. The term "linear polarization' may generally refer to a single direction of the orientation of the electric field vector. Generally, an arbitrary linearly polarized wave can be resolved into two independent orthogonal components labeled X and Y, which are in phase or out of phase with each other. For example, in polarization multiplexed transmission, an optical beam created by a laser may be highly linearly polarized. The beam may be divided by a polarization beam splitter according to the X-polarization component of the beam and the Y-polarization component of the beam. Upon being split, the X-polarization component may be aligned with a horizontal axis and the Y-polarization component may be aligned with a vertical axis of the beam. It is understood that the terms "horizontal" polarization and "vertical" polarization (also referred to as X-polarization and Y-polarization) are merely used to denote a frame of reference for descriptive purposes, and do not relate to any particular polarization orientation.

Following splitting of the beam into the X- and Y-polarization components, information may be modulated onto both beams. Following modulation, both beams may be combined by a polarization beam combiner such that the combined beam comprises an optical signal with two polarization components (e.g., an X-polarization component and a Y-polarization component) with information modulated onto each polarization component. Accordingly, by modulating information onto both the X-polarization component and Y-polarization component of the signal, the amount of information that may be carried by the channel associated with the signal over any given time may increase (i.e., the bit rate of the channel may be increased).

In the present disclosure, it is understood that as signals travel through the network, the polarization of the signals may rotate with respect to the frame of reference. Consequently, the modulated X- and Y-polarization components may also be rotated such that the components are no longer aligned with the horizontal axis and the vertical axis of the frame of reference. However, the terms "X-polarization" and "Y-polarization" of the signal may still be used to denote the polarization components with information modulated thereon even if the modulated X- and Y-polarization components are no longer oriented with the horizontal and vertical axes of the frame of reference.

In operation of network 101, the optical signals may be dual polarized, with orthogonal polarization components in the X- and Y-axes. In various embodiments of network 101, certain components of elements of network 101 may exhibit polarization dependent loss (PDL), which may result in degradation of optical signal-to-noise ratio (OSNR) of the transmitted optical signal, as well as nonlinear phase noise resulting from cross talk between the two orthogonal polarization components. Components of network 101 that may contribute to PDL (referred to herein individually as a "PDL tributary") include multiplexer 104, amplifier 108, OADM 110, as well as other components (not shown), including dispersion compensators, wavelength selective switches, couplers, etc. (see International Telecommunication Union ITU-T G.680). The polarization dependent loss may be observed for different types of modulation schemes used for transmitting optical signals. Furthermore, in addition to polarization dependent loss, amplifiers in network 101 may exhibit amplified spontaneous emission (ASE) noise which may also contribute to OSNR degradation.

As will be described in further detail herein, the novel methods and systems disclosed herein for asymmetrically compensating polarization dependent loss in dual-polarization optical signals may utilize an OSNR compensator that includes OSNR monitors and a phase-sensitive amplifier (PSA). The dual-polarized optical signal may be separated into X- and Y-polarization components. An asymmetrically degraded polarization component may be registered by the OSNR monitors and may be asymmetrically compensated using the phase-sensitive amplifier. Various configurations and implementations of the disclosed OSNR compensator are described in further detail herein.

Figure 2:
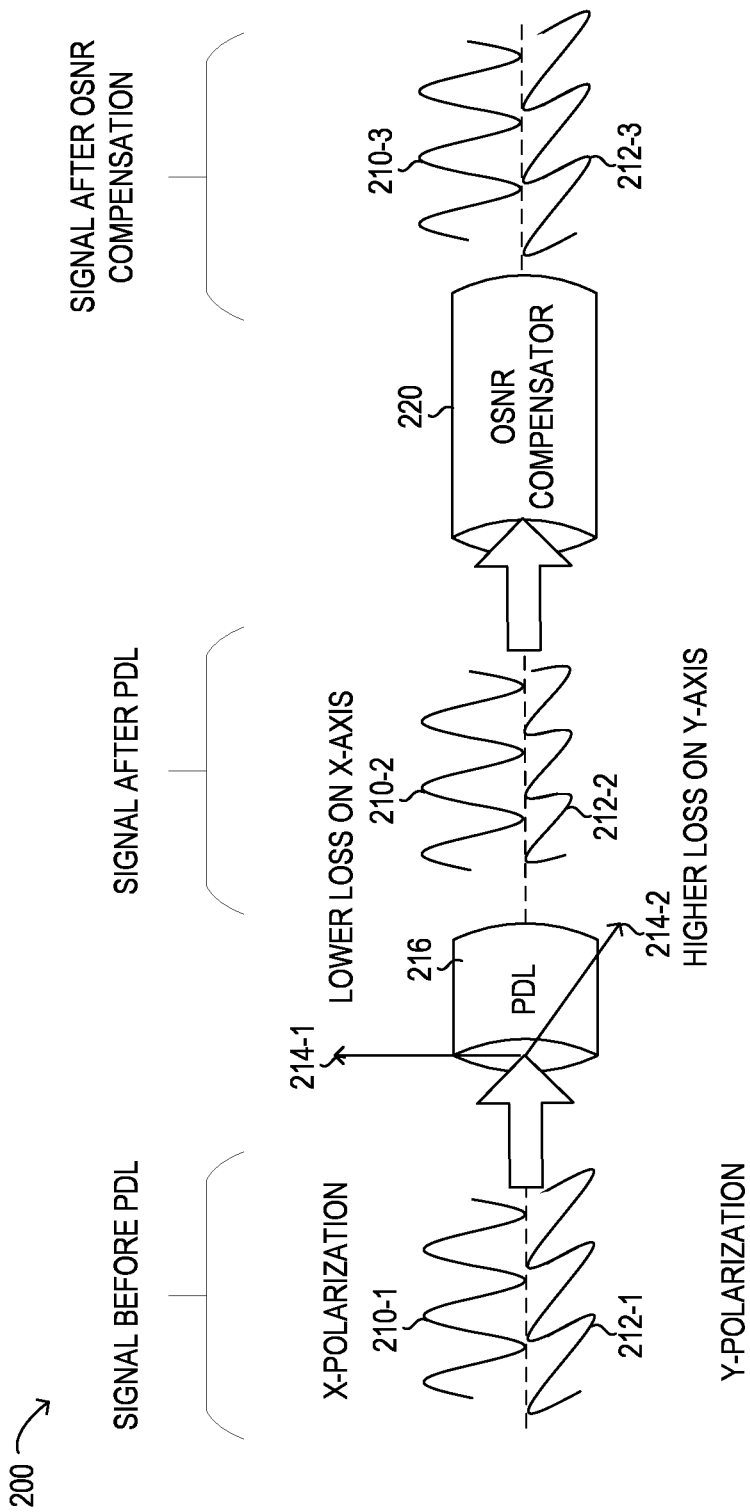
FIG. 2 is a block diagram of selected elements of an embodiment of an optical system illustrating asymmetric PDL and asymmetric OSNR compensation.

Turning now to FIG. 2, a block diagram of selected elements of optical system 200 illustrating the impact of polarization dependent loss (PDL) and asymmetric OSNR compensation is shown. As shown in FIG. 2, system 200 may represent transmission of a dual-polarization optical signal over an optical network, such as network 101 (see FIG. 1). In FIG. 2, the dual-polarization optical signal prior to PDL is shown having symmetric polarization components. Specifically, X-polarization component 210-1 and Y-polarization component 212-1 may exhibit about the same OSNR. During transmission, such as over network 101, the optical signal may be subject to PDL 216 from a variety of sources, as described previously. In particular, OSNR degradation due to PDL 216 may be asymmetric with respect to the polarization axes, such that losses due to PDL 216 may be lower on X-axis 214-1 and may be greater on Y-axis 214-2. After exposure to PDL 216, thus, the optical signal may exhibit X-polarization component 210-2 having higher OSNR and Y-polarization component 212-2 having lower OSNR. In other words, the OSNR of X-polarization component 210-2 may be comparable to the original OSNR of X-polarization component 210-1, while the OSNR of Y-polarization component 212-2 may be degraded with respect to the original OSNR of Y-polarization component 212-1. After the optical signal is operated on by OSNR compensator 220, the OSNR of X-polarization component 210-3 and Y-polarization component 212-3 may be restored to be symmetric and/or comparable to the OSNR prior to PDL degradation.

Figure 3A:
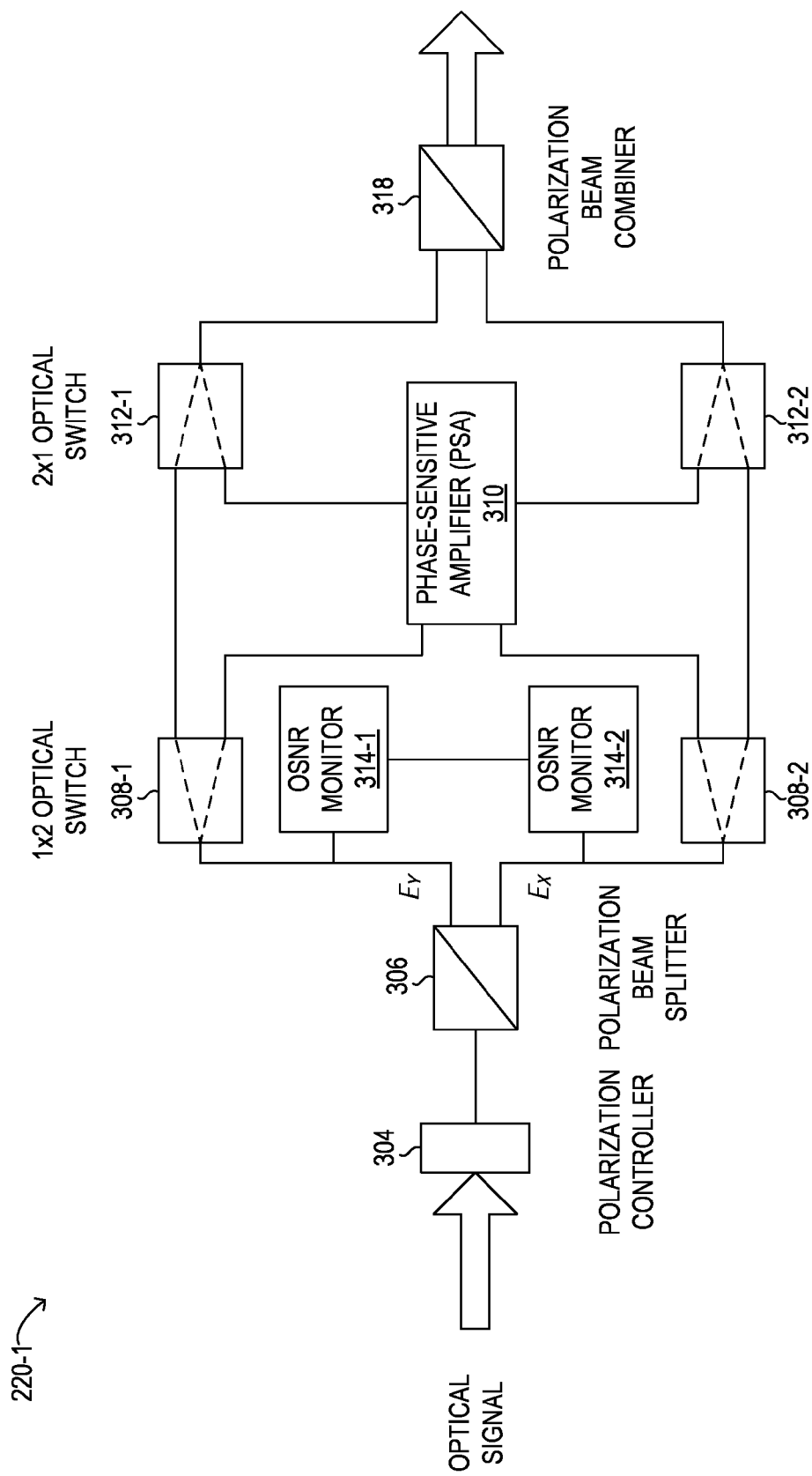
FIGS. 3A-3D are block diagrams of selected elements of embodiments of an OSNR compensator.

Referring now to FIG. 3A, a block diagram of selected elements of an embodiment of OSNR compensator 220-1 is shown. OSNR compensator 220-1 may represent one of a plurality of implementations of an OSNR compensator, as described herein. It is noted that certain elements depicted in OSNR compensator 220-1 may be modified, rearranged, omitted, and/or added in various embodiments.

In FIG. 3A, an optical signal may be received at polarization controller 304. In certain embodiments, the optical signal may be filtered (not shown) from a WDM optical signal. The optical signal may be dual-polarized, while polarization controller 304 may rotate a state of polarization (SOP) of the optical signal to a desired value, for example 45 degrees. Then, at polarization beam splitter (PBS) 306, the optical signal may be separated into X- and Y-polarization components, such that each component follows a separate optical path, namely an X-polarization optical signal transmission path and a Y-polarization optical signal transmission path. Respectively corresponding to each path, OSNR monitors 314-1 and 314-2 may measure OSNR for the X- and Y-polarization components. OSNR monitors 314-1 and 314-2 may operate cooperatively to determine which of the X- and Y-polarization components exhibits greater PDL-induced OSNR degradation. A polarization component selected from the X- and Y-polarization components having a lower OSNR may be determined to be a degraded polarization component, while the other remaining polarization component may be determined to be an undegraded polarization component. Then, OSNR monitors 314-1 and 314-2 may further operate cooperatively to switch the degraded polarization component to phase-sensitive amplifier (PSA) 310, while the undegraded component is switched to pass through. It is noted that while all optical pathways are shown in FIG. 3A for descriptive clarity, it will be understood that switch pairs 308 and 312 may operate to selectively switch the X- and Y-polarization components across PSA 310. Specifically, 1×2 optical switch 308-1 may route the Y-polarization component to either PSA 310 or a pass-through path, while 2×1 optical switch 312-1 may receive either the pass-through path or an output signal from PSA 310. Switches 308-2 and 312-2 may operate in a similar manner on the X-polarization component. PSA 310 may compensate OSNR as described with respect to FIG. 2 (see also FIG. 6A). Finally, polarization beam combiner 318 may combine the X- and Y-polarization components to output an optical signal having relatively symmetric OSNR on each polarization component.

Figure 3B:
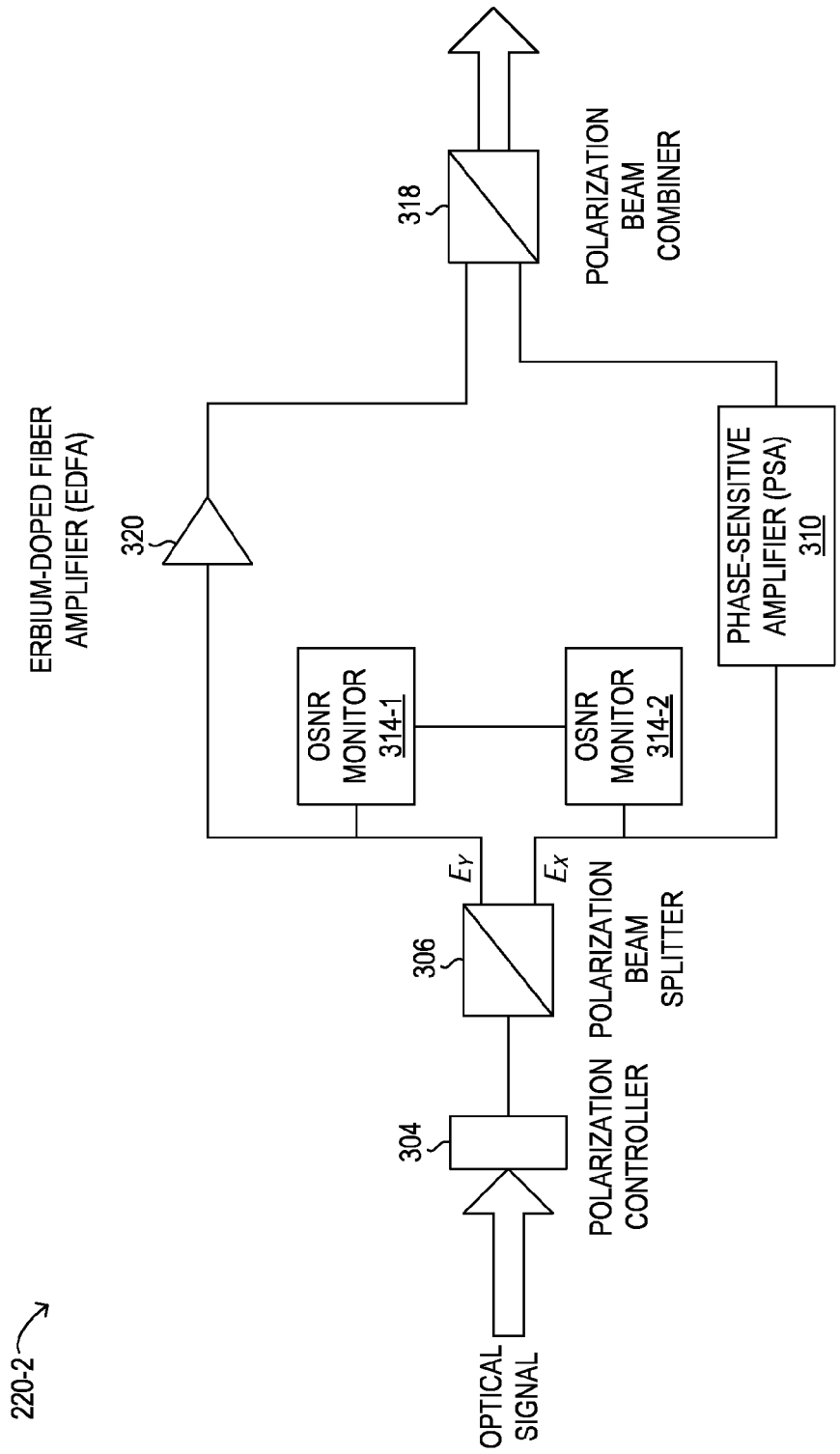

Referring now to FIG. 3B, a block diagram of selected elements of an embodiment of OSNR compensator 220-2 is shown. OSNR compensator 220-2 may represent one of a plurality of implementations of an OSNR compensator, as described herein. It is noted that certain elements depicted in OSNR compensator 220-2 may be modified, rearranged, omitted, and/or added in various embodiments.

In FIG. 3B, an optical signal may be received at polarization controller 304. In certain embodiments, the optical signal may be filtered (not shown) from a WDM optical signal. The optical signal may be dual-polarized, while polarization controller 304 may rotate a state of polarization (SOP) of the optical signal to a desired value, for example 45 degrees. Then, at polarization beam splitter (PBS) 306, the optical signal may be separated into X- and Y-polarization components, such that each component follows a separate optical path, namely an X-polarization optical signal transmission path and a Y-polarization optical signal transmission path. Respectively corresponding to each path, OSNR monitors 314-1 and 314-2 may measure OSNR for the X- and Y-polarization components. OSNR monitors 314-1 and 314-2 may operate cooperatively to determine which of the X- and Y-polarization components exhibits greater PDL-induced OSNR degradation. A polarization component selected from the X- and Y-polarization components having a lower OSNR may be determined to be a degraded polarization component, while the other remaining polarization component may be determined to be an undegraded polarization component. Then, OSNR monitors 314-1 and 314-2 may operate cooperatively to send a feedback signal (not shown) to control polarization controller 304 such that the degraded polarization component (having a lower OSNR) is routed to PSA 310, while the undegraded polarization component is routed to EDFA 320. Polarization controller 304 may control routing of individual polarization components by rotating the respective dual polarization components to be aligned with an X-polarization axis and a Y-polarization axis, as desired, with respect to polarization beam splitter 306. PSA 310 may compensate OSNR as described with respect to FIG. 2 (see also FIG. 6A). Finally, polarization beam combiner 318 may combine the X- and Y-polarization components to output an optical signal having relatively symmetric OSNR on each polarization component.

Figure 3C:
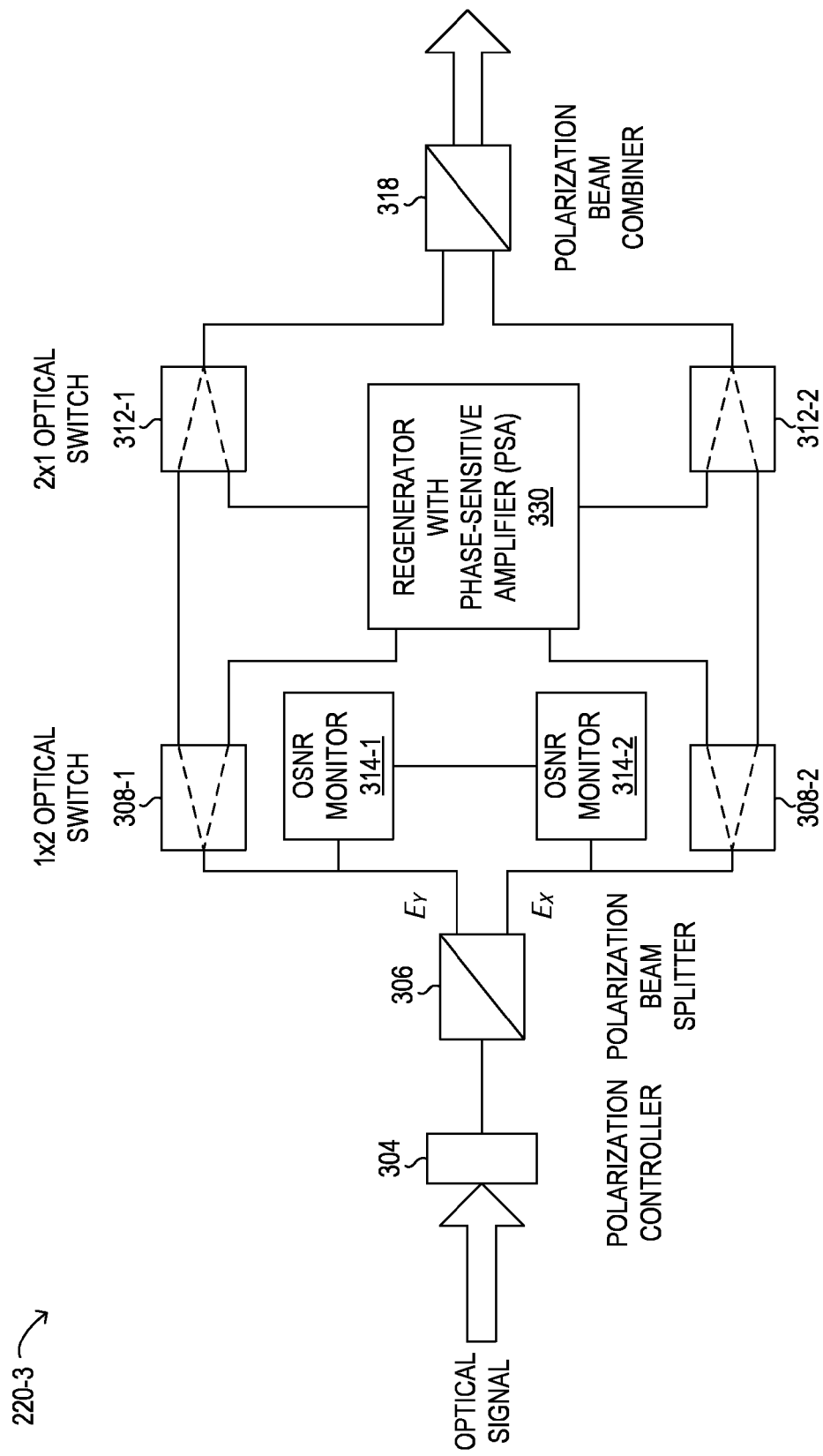

Referring now to FIG. 3C, a block diagram of selected elements of an embodiment of OSNR compensator 220-3 is shown. OSNR compensator 220-3 may represent one of a plurality of implementations of an OSNR compensator, as described herein. It is noted that certain elements depicted in OSNR compensator 220-3 may be modified, rearranged, omitted, and/or added in various embodiments.

In FIG. 3C, an optical signal may be received at polarization controller 304. In certain embodiments, the optical signal may be filtered (not shown) from a WDM optical signal. The optical signal may be dual-polarized, while polarization controller 304 may rotate a state of polarization (SOP) of the optical signal to a desired value, for example 45 degrees. Then, at polarization beam splitter (PBS) 306, the optical signal may be separated into X- and Y-polarization components, such that each component follows a separate optical path, namely an X-polarization optical signal transmission path and a Y-polarization optical signal transmission path. Respectively corresponding to each path, OSNR monitors 314-1 and 314-2 may measure OSNR for the X- and Y-polarization components. OSNR monitors 314-1 and 314-2 may operate cooperatively to determine which of the X- and Y-polarization components exhibits greater PDL-induced OSNR degradation. A polarization component selected from the X- and Y-polarization components having a lower OSNR may be determined to be a degraded polarization component, while the other remaining polarization component may be determined to be an undegraded polarization component. Then, OSNR monitors 314-1 and 314-2 may further operate cooperatively to switch the degraded polarization component to regenerator with phase-sensitive amplifier (PSA) 330, while the undegraded component is switched to pass through. It is noted that while all optical pathways are shown in FIG. 3C for descriptive clarity, it will be understood that switch pairs 308 and 312 may operate to selectively switch the X- and Y-polarization components across regenerator with PSA 330. Specifically, 1×2 optical switch 308-1 may route the Y-polarization component to either regenerator with PSA 330 or a pass-through path, while 2×1 optical switch 312-1 may receive either the pass-through path or an output signal from regenerator with PSA 330. Switches 308-2 and 312-2 may operate in a similar manner on the X-polarization component. Regenerator with PSA 330 may compensate OSNR as described with respect to FIG. 2 (see also FIG. 6B). Finally, polarization beam combiner 318 may combine the X- and Y-polarization components to output an optical signal having relatively symmetric OSNR on each polarization component.

Figure 3D:
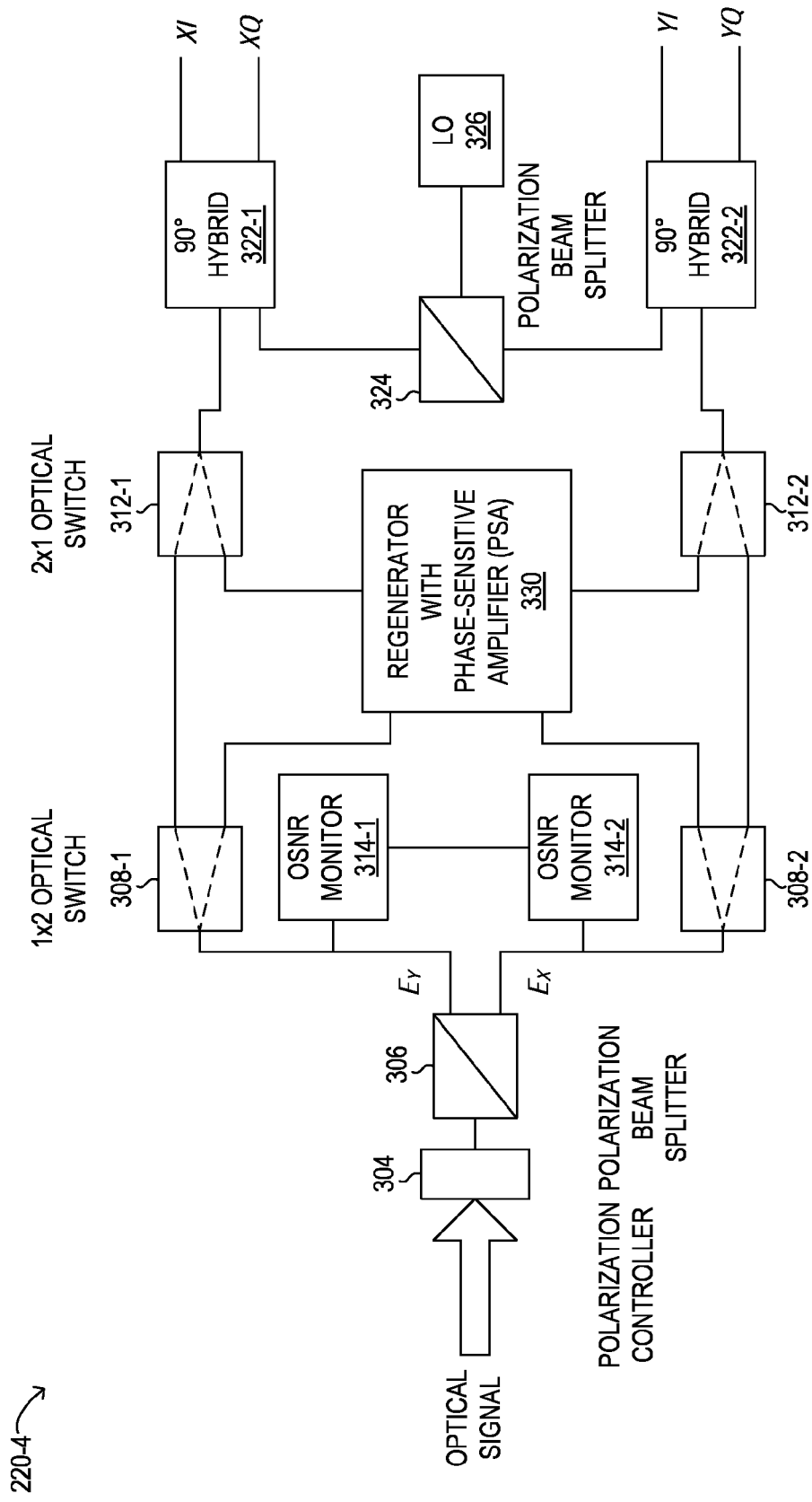

Referring now to FIG. 3D, a block diagram of selected elements of an embodiment of receiver with OSNR compensator 220-4 is shown. Receiver with OSNR compensator 220-4 may represent one of a plurality of implementations of an OSNR compensator, as described herein. It is noted that certain elements depicted in receiver with OSNR compensator 220-4 may be modified, rearranged, omitted, and/or added in various embodiments.

Figure 6A:
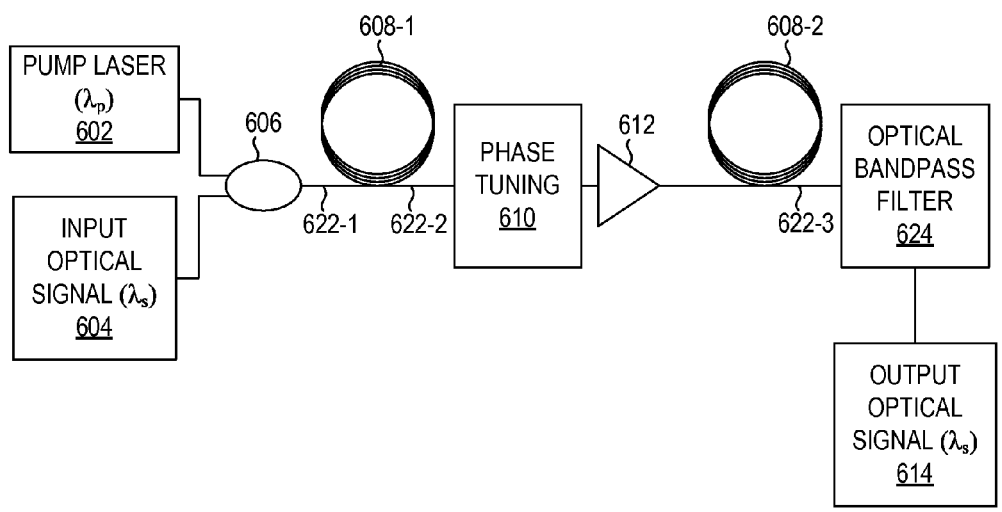
FIG. 6A is a block diagram of selected elements of an embodiment of a phase-sensitive amplifier (PSA)
Figure 6A:
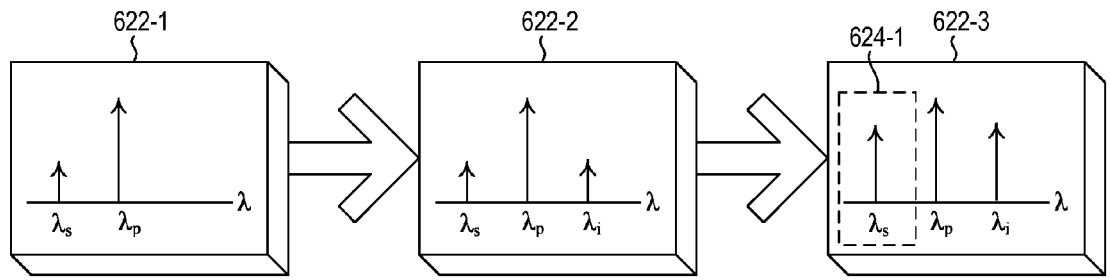
Figure 6B:
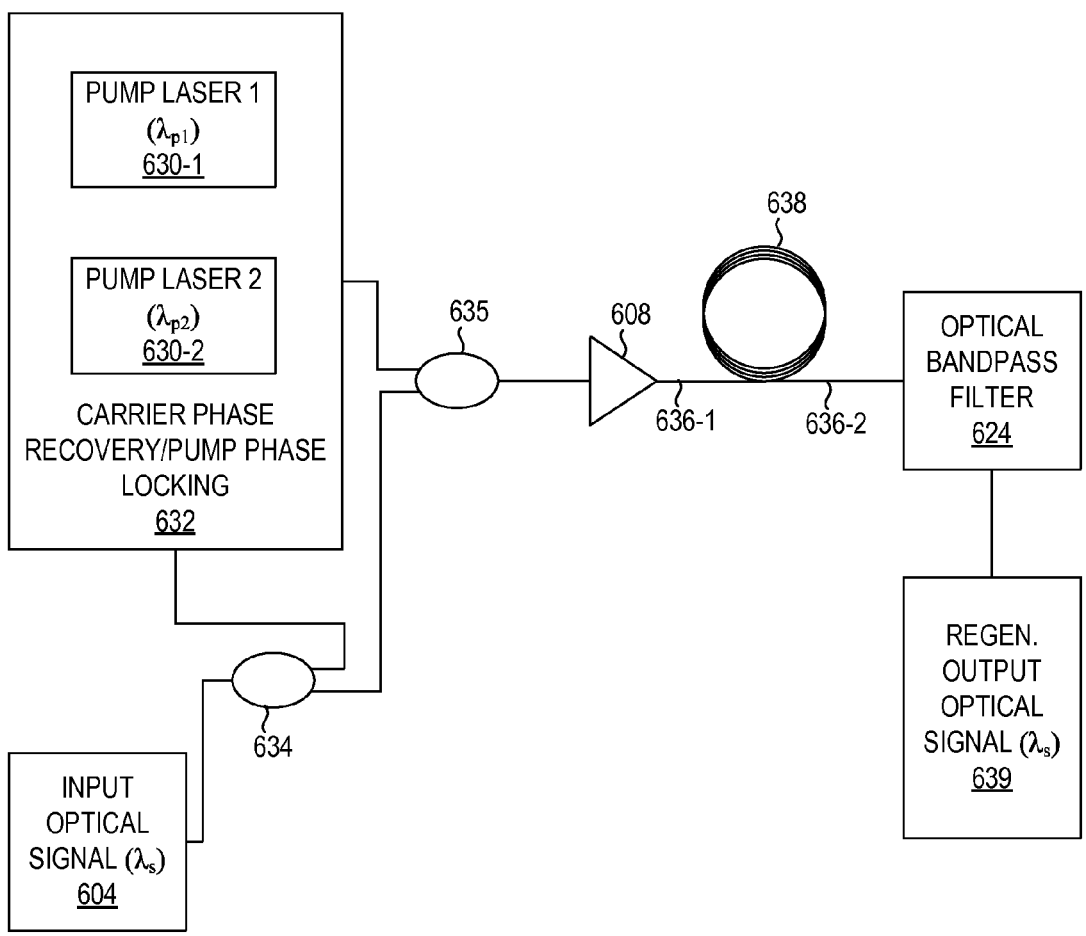
FIG. 6B is a block diagram of selected elements of an embodiment of a regenerator with a phase-sensitive amplifier (PSA)
Figure 6B:
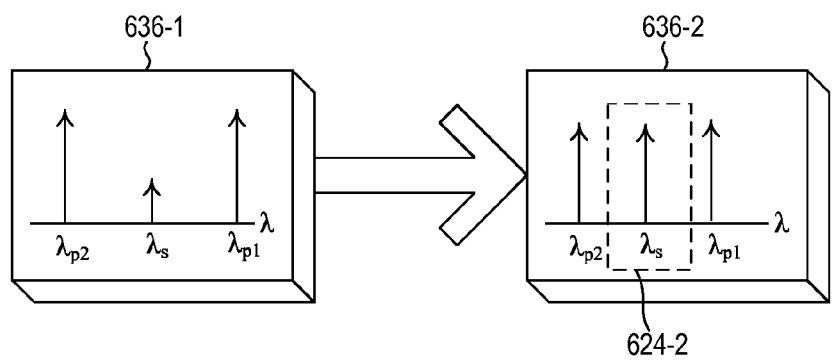

In FIG. 3D, receiver with OSNR compensator 220-4 may be implemented and operate in a similar manner as OSNR compensator 220-3 (see FIG. 3C) with respect to polarization controller 304, polarization beam splitter 306, OSNR monitors 314, optical switches 308 and 312, as well as regenerator with PSA 330 (see also FIG. 6B). However, receiver with OSNR compensator 220-4 may represent an embodiment that includes elements of receiver 112, such that the X- and Y-polarization components are not combined for transmission to a receiver, but are demodulated using local oscillator (LO) 326, which is fed through polarization beam splitter 324 to 90° hybrid 322-1 and 322-2, from where XI/XQ and YI/YQ signal pairs are subsequently processed as in receiver 112 (i.e., optical-to-electrical conversion, analog-to-digital conversion, and digital signal processing (DSP), not shown in FIG. 3D). In this manner, receiver with OSNR compensator 220-4 may be used within receiver 112 (see also FIG. 4E).

Figure 4A:
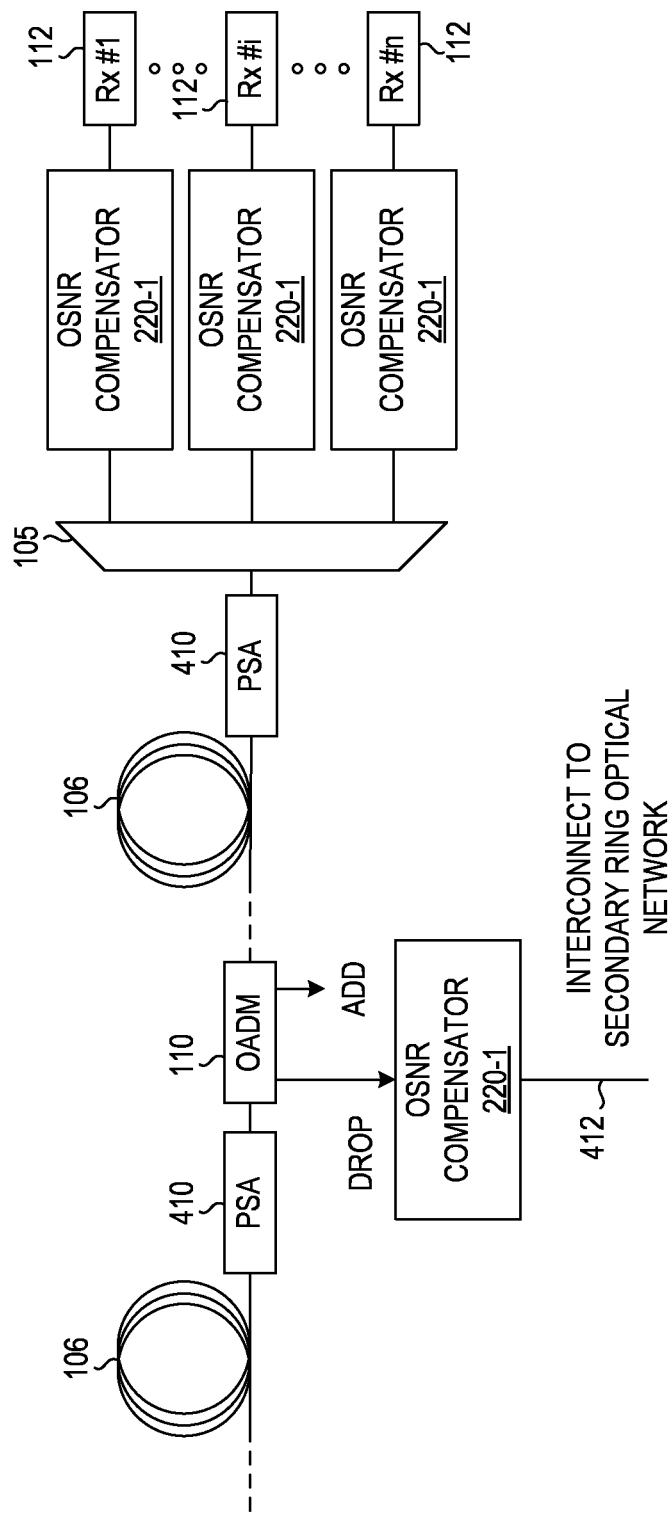
FIGS. 4A-4E are block diagrams of selected elements of embodiments of an optical network implementing an OSNR compensator.

Referring now to FIG. 4A, a block diagram of selected elements of an embodiment of network 101-1 is shown. Network 101-1 may represent an embodiment of network 101 (see FIG. 1) showing how OSNR compensator 220-1 (see FIG. 3A), may be used. It is noted that certain elements depicted in network 101-1 may be modified, rearranged, omitted, and/or added in various embodiments.

In FIG. 4A, network 101-1 may be implemented and operate in a similar manner as network 101 (see FIG. 1) with respect to fiber 106, OADM 110, demultiplexer 105, and receiver 112. It is noted that while network 101-1 is depicted as a portion of network 101 for descriptive clarity in FIG. 4A, it will be understood that network 101-1 represents a functional optical communication system, as described above with respect to network 101. In network 101-1, amplifiers 108 (see FIG. 1) have been replaced with PSA 410 (see FIG. 6A), while OSNR compensators 220-1 (see FIG. 3A) are used to asymmetrically compensate for PDL-induced OSNR degradation immediately prior to each instance of receiver 112. Also shown in network 101-1 is an instance of OSNR compensator 220-1 linked to OADM 110 where interconnect 412 may link network 101-1 to a secondary ring optical network (not shown).

Figure 4B:
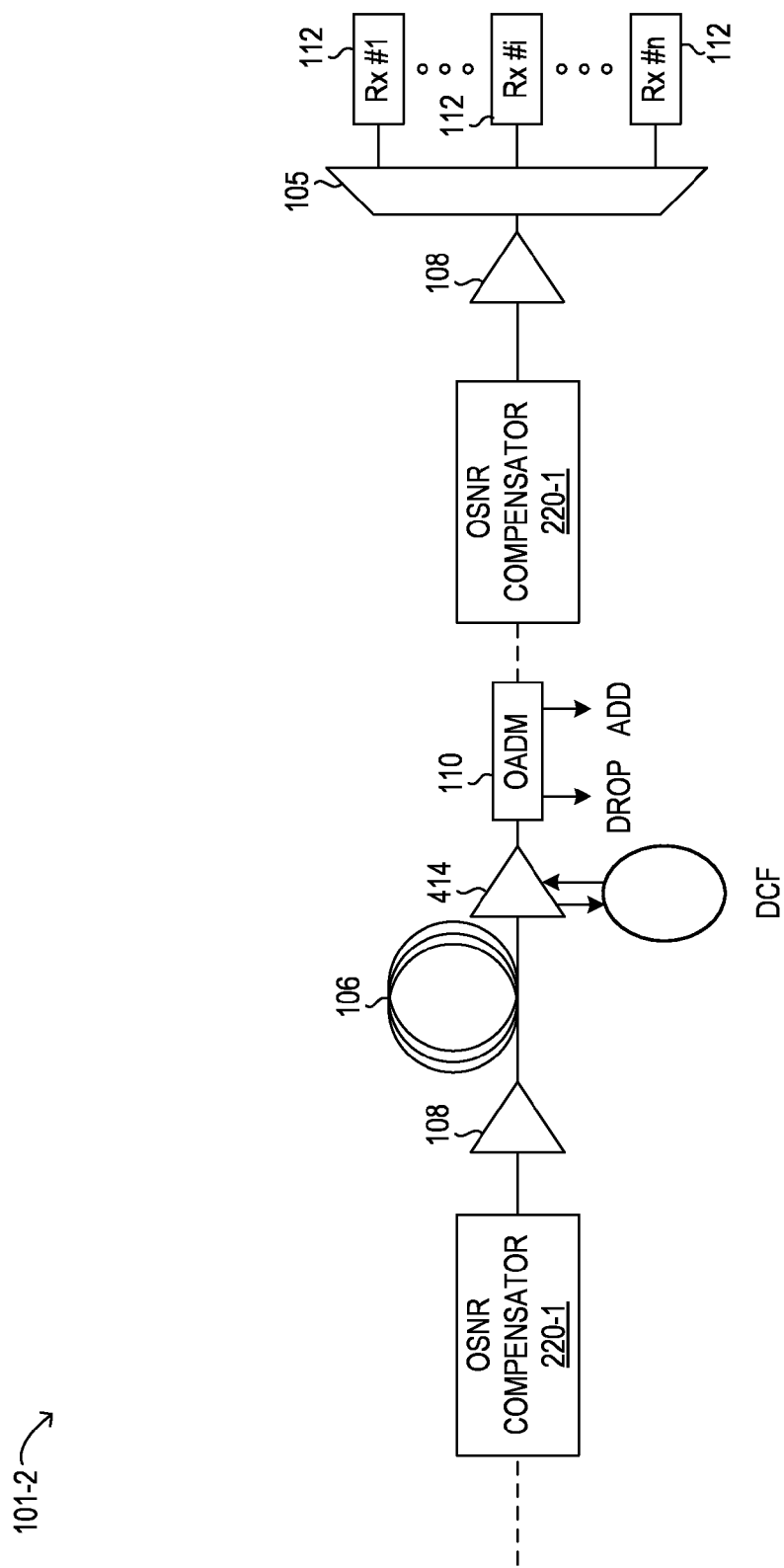

Referring now to FIG. 4B, a block diagram of selected elements of an embodiment of network 101-2 is shown. Network 101-2 may represent an embodiment of network 101 (see FIG. 1) showing how OSNR compensator 220-1 (see FIG. 3A), may be used. It is noted that certain elements depicted in network 101-2 may be modified, rearranged, omitted, and/or added in various embodiments.

In FIG. 4B, network 101-2 may be implemented and operate in a similar manner as network 101 (see FIG. 1) with respect to amplifier 108, fiber 106, OADM 110, demultiplexer 105, and receiver 112. Also shown in network 101-2 is dispersion compensating module 414, which may include a dispersion compensating fiber (DCF). It is noted that while network 101-2 is depicted as a portion of network 101 for descriptive clarity in FIG. 4B, it will be understood that network 101-2 represents a functional optical communication system, as described above with respect to network 101. In network 101-2, OSNR compensators 220-1 (see FIG. 3A) have been placed in-line after PDL tributaries, but before amplifier 108, which may be an EDFA.

Figure 4C:
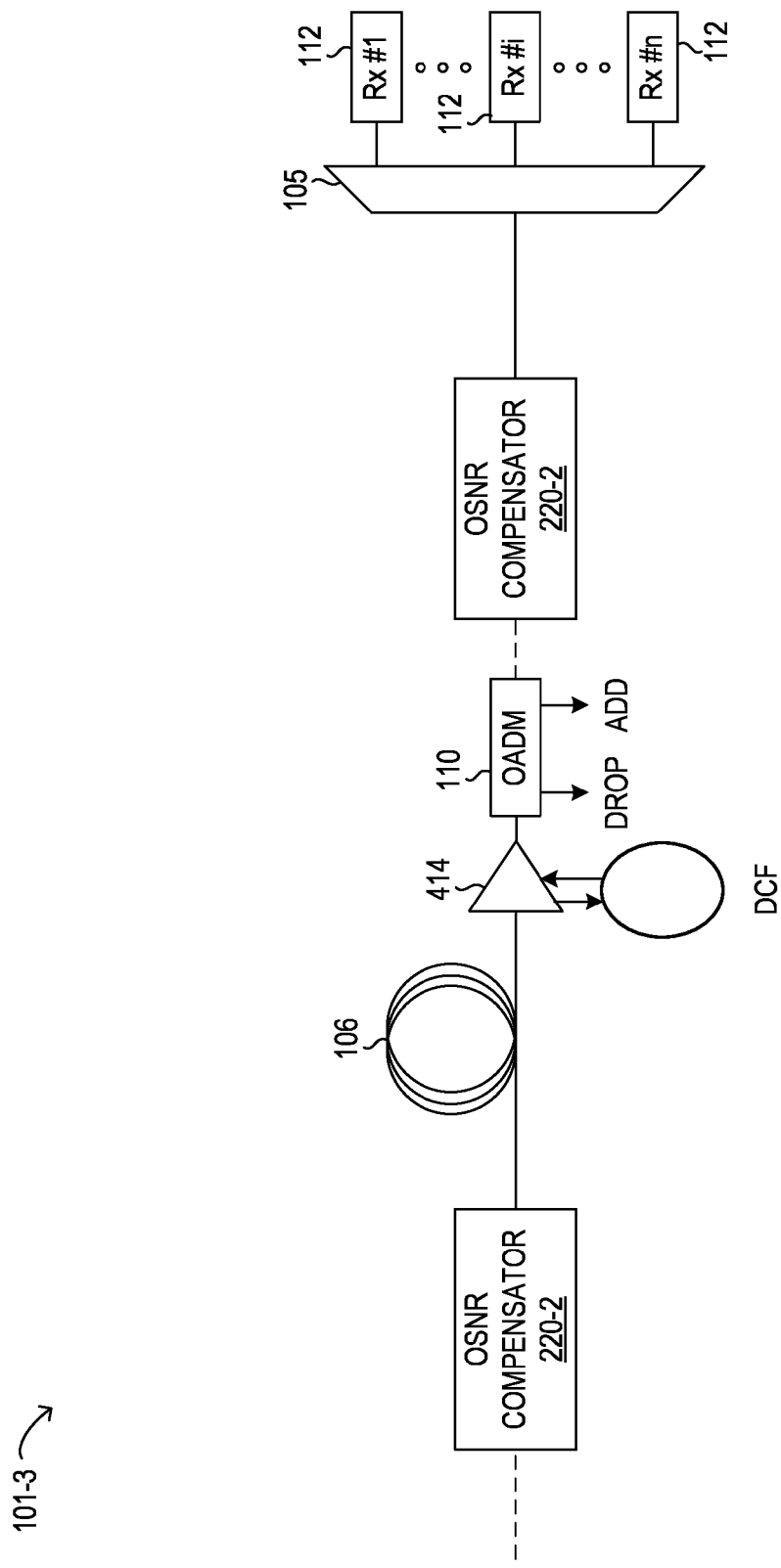

Referring now to FIG. 4C, a block diagram of selected elements of an embodiment of network 101-3 is shown. Network 101-3 may represent an embodiment of network 101 (see FIG. 1) showing how OSNR compensator 220-2 (see FIG. 3B), may be used. It is noted that certain elements depicted in network 101-3 may be modified, rearranged, omitted, and/or added in various embodiments.

In FIG. 4C, network 101-3 may be implemented and operate in a similar manner as network 101 (see FIG. 1) with respect to fiber 106, OADM 110, demultiplexer 105, and receiver 112. Also shown in network 101-3 is dispersion compensating module 414, which may include a dispersion compensating fiber (DCF). It is noted that while network 101-3 is depicted as a portion of network 101 for descriptive clarity in FIG. 4C, it will be understood that network 101-3 represents a functional optical communication system, as described above with respect to network 101. In network 101-3, OSNR compensators 220-2 (see FIG. 3B) have been placed in-line to replace amplifier 108 (see FIG. 1), since OSNR compensator 220-2 includes EDFA 320.

Figure 4D:
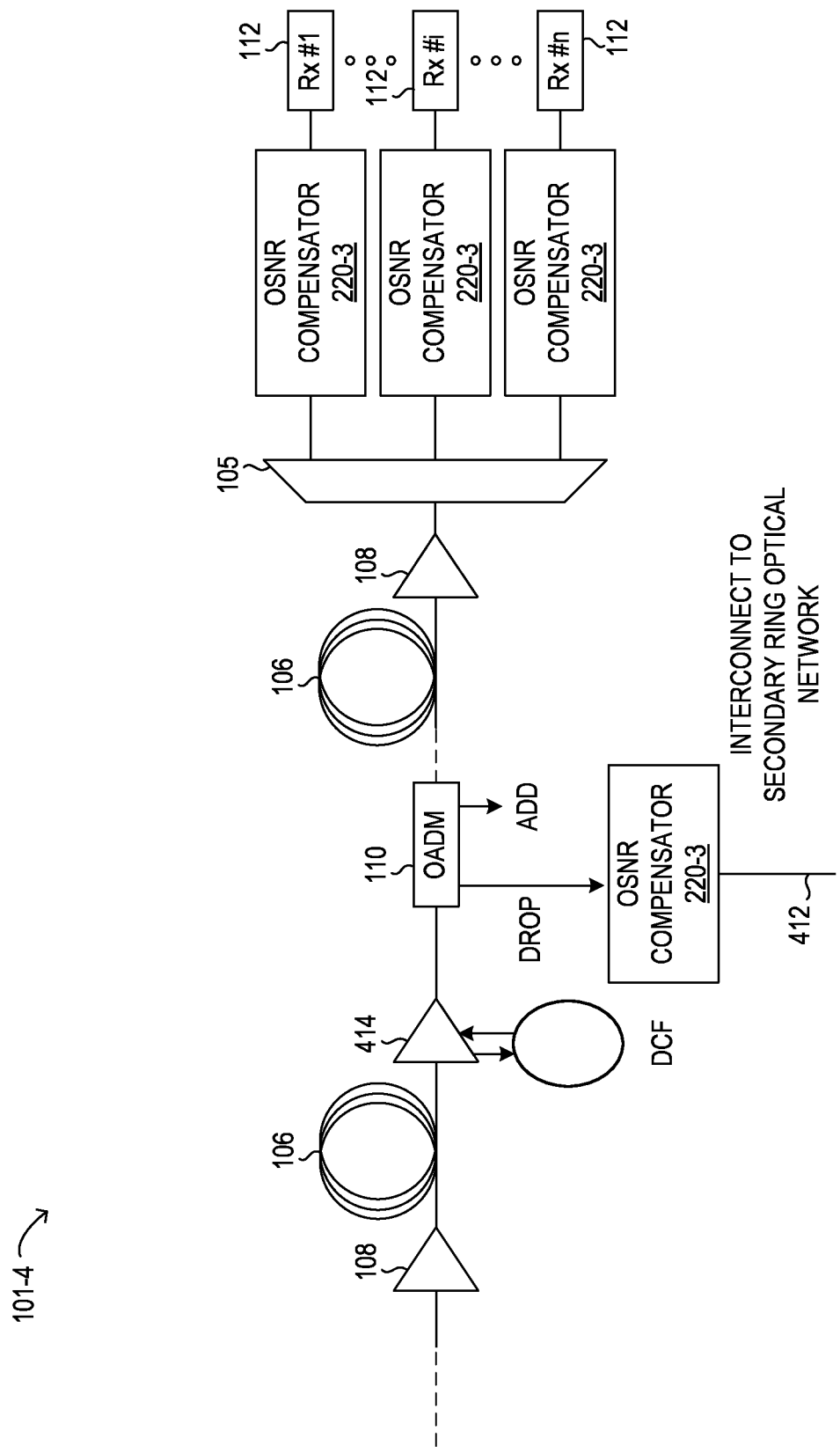

Referring now to FIG. 4D, a block diagram of selected elements of an embodiment of network 101-4 is shown. Network 101-4 may represent an embodiment of network 101 (see FIG. 1) showing how OSNR compensator 220-3 (see FIG. 3C), may be used. It is noted that certain elements depicted in network 101-4 may be modified, rearranged, omitted, and/or added in various embodiments.

In FIG. 4D, network 101-4 may be implemented and operate in a similar manner as network 101 (see FIG. 1) with respect to amplifier 108, fiber 106, OADM 110, demultiplexer 105, and receiver 112. Also shown in network 101-4 is dispersion compensating module 414, which may include a dispersion compensating fiber (DCF). It is noted that while network 101-4 is depicted as a portion of network 101 for descriptive clarity in FIG. 4D, it will be understood that network 101-4 represents a functional optical communication system, as described above with respect to network 101. In network 101-4, OSNR compensators 220-3 (see FIG. 3C) are used to asymmetrically compensate for PDL-induced OSNR degradation immediately prior to each instance of receiver 112. Also shown in network 101-1 is an instance of OSNR compensator 220-3 linked to OADM 110 where interconnect 412 may link network 101-4 to a secondary ring optical network (not shown).

Figure 4E:
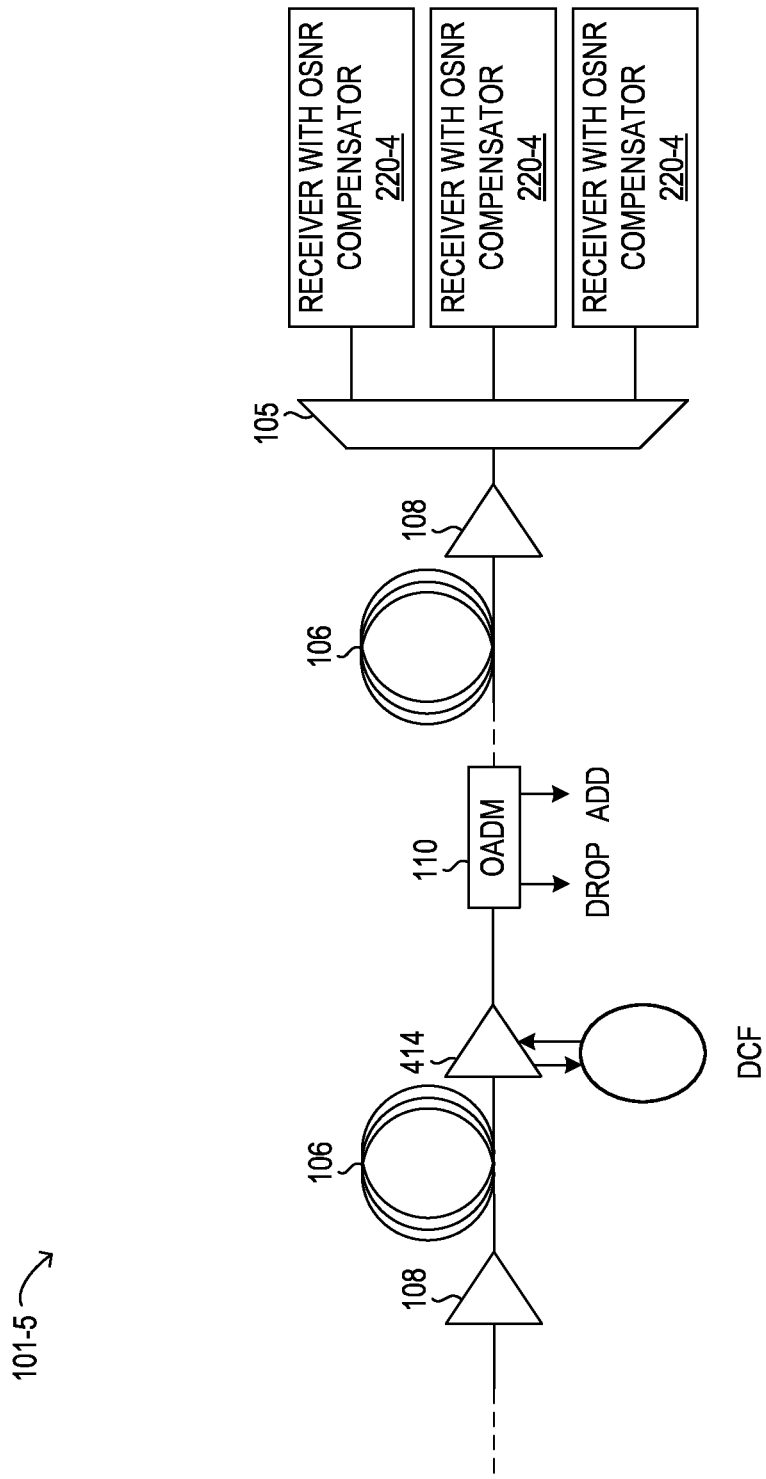

Referring now to FIG. 4E, a block diagram of selected elements of an embodiment of network 101-5 is shown. Network 101-5 may represent an embodiment of network 101 (see FIG. 1) showing how receiver with OSNR compensator 220-4 (see FIG. 3D), may be used. It is noted that certain elements depicted in network 101-5 may be modified, rearranged, omitted, and/or added in various embodiments.

In FIG. 4E, network 101-5 may be implemented and operate in a similar manner as network 101 (see FIG. 1) with respect to amplifier 108, fiber 106, OADM 110, and demultiplexer 105. Also shown in network 101-5 is dispersion compensating module 414, which may include a dispersion compensating fiber (DCF). It is noted that while network 101-5 is depicted as a portion of network 101 for descriptive clarity in FIG. 4E, it will be understood that network 101-5 represents a functional optical communication system, as described above with respect to network 101. In network 101-5, receivers with OSNR compensator 220-4 (see FIG. 3D) are used to asymmetrically compensate for PDL-induced OSNR degradation as a part of receiver 112 (see FIG. 1), since receiver with OSNR compensator 220-4 may include certain modules (i.e., a polarization controller and a polarization beam splitter) found in receiver 112.

Figure 5:
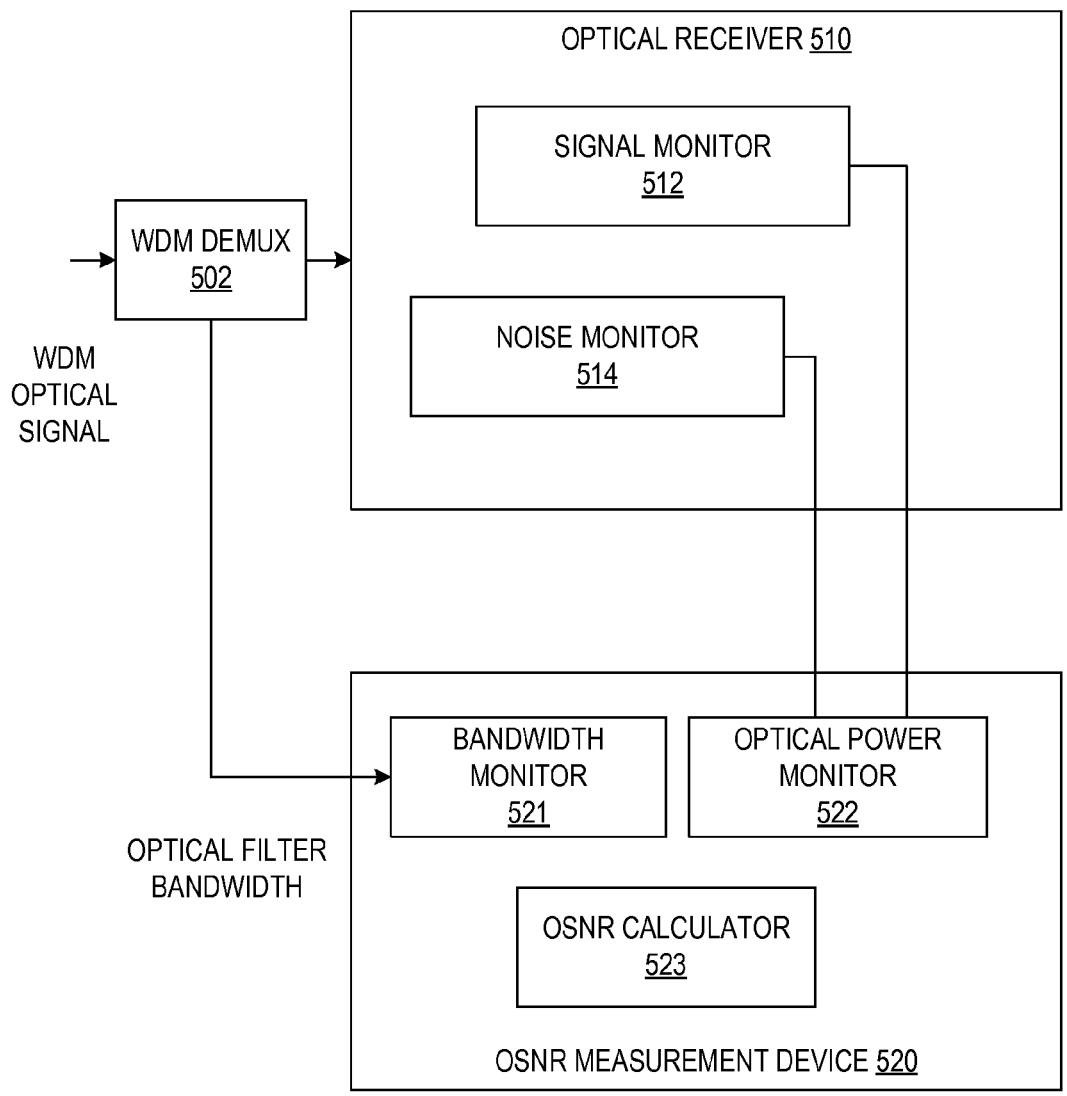
FIG. 5 is a block diagram of selected elements of an embodiment of an OSNR monitor.

Turning now to FIG. 5, a configuration of an OSNR monitor is illustrated (see also FIGS. 3A-D). As shown in FIG. 5, OSNR monitor 314 includes optical receiver 510 which receives an optical signal and OSNR measurement device 520 which measures an OSNR of optical receiver 510 and is connected to demultiplexer (WDM DMUX) 502.

In FIG. 5, demultiplexer (WDM DMUX) 502 may extract an optical signal of a desired reception wavelength from a received wavelength-multiplexed optical signal. In certain embodiments, demultiplexer 502 may include an optical filter (not shown) in which a passband is set in advance, such that the optical filter performs filtering on the WDM optical signal. Then, demultiplexer 502 may output the optical signal which has been subjected to filtering performed by the optical filter to optical receiver 510, and may output an indication of the optical filter bandwidth to bandwidth monitor 521.

As shown in FIG. 5, optical receiver 510 included in OSNR monitor 314 may include signal monitor 512 and noise monitor 514. It is noted that signal monitor 512 and noise monitor 514 may operate according to various methods to determine a signal intensity (i.e., optical power) and a noise intensity, respectively. For example, signal monitor 512 may measure an optical power of an input signal having a data signal and a noise component, such as ASE noise, while noise monitor 514 may measure an optical power of the ASE noise alone.

In FIG. 5, OSNR measurement device 520 may measure an optical signal-to-noise ratio (OSNR) representing a quality of a signal which has been supplied to optical receiver 510. As shown in FIG. 5, OSNR measurement device 520 may include bandwidth monitor 521, optical-power monitor 522, and OSNR calculator 523. Bandwidth monitor 521 may receive the indication of the optical filter bandwidth, as described above. Then, bandwidth monitor 521 may output the obtained bandwidth to OSNR calculator 523.

In FIG. 5, optical power monitor 522 may obtain values for optical power (i.e., signal intensity) from signal monitor 512 and noise monitor 514. For example, optical power monitor 522 may determine average values for optical power based on the received optical power values. In one embodiment, OSNR calculator 523 may calculate an OSNR according to Equation (1).

$$OSNR[\text{dB}] = 10\log(P2 - P1) - 10\log\left(2 * P1 * \frac{0.1}{BW}\right) \quad \text{Equation (1)}$$

In Equation (1), P2 may represent an intensity value for signal and noise collectively, P1 may represent an intensity value for noise alone, while BW may represent the optical filter bandwidth.

Referring now to FIG. 6A, a block diagram of selected elements of an embodiment of phase-sensitive amplifier (PSA) 310 is shown. PSA 310 may represent an embodiment of a phase-sensitive amplifier used with OSNR compensator 220 (see FIGS. 3A and 3B). It is noted that certain elements depicted in PSA 310 in FIG. 6A may be modified, rearranged, and/or omitted, in various embodiments. In FIG. 6A, PSA 310 is shown without certain optical elements for descriptive clarity. In various embodiments, PSA 310 may exhibit an ultra-low noise figure (near 0 dBm fiber input power), may be capable of high gain with ultra-fast response without thermal effects, and therefore may be well suited to reduce phase noise in very high bandwidth applications.

In FIG. 6A, pump laser ($\lambda_p$) 602 may be combined at optical combiner 606 with input optical signal ($\lambda_s$) 604 resulting in signal profile 622-1, where pump laser ($\lambda_p$) 602 may have higher intensity relative to input optical signal ($\lambda_s$) 604. Since input optical signal ($\lambda_s$) 604 may be relatively weak, PSA 310 may serve to amplify input optical signal ($\lambda_s$) 604. At the output of optical combiner 606, signal profile 622-1 may be observed, in which optical signal ($\lambda_s$) and pump signal ($\lambda_p$) are present. In certain embodiments, polarization control (not shown) may be implemented at input optical signal ($\lambda_s$) 604 and/or pump laser ($\lambda_p$) 602. Then, four wave mixing (FWM) may occur within nonlinear medium 608-1. Although shown as a fiber segments for descriptive clarity, it is noted that nonlinear media 608 may represent any of a variety of nonlinear optical media having third-order optical nonlinearity ($\chi^{(3)}$). After four wave mixing within nonlinear medium 608-1, signal profile 622-2 may be observed, in which a phase conjugate idler signal ($\lambda_i$) has emerged in addition to optical signal ($\lambda_s$) and pump signal ($\lambda_p$). Then, the optical signal represented by signal profile 622-2 may be fed to phase tuning 610 where a relative phase between optical signal ($\lambda_s$), idler signal ($\lambda_i$), and pump signal ($\lambda_p$) may be adjusted, as desired. Next, EDFA 612 may be employed for amplification of the optical signal before second FWM occurs within nonlinear medium 608-2. After FWM within nonlinear medium 608-2, signal profile 622-3 may be observed, in which optical signal ($\lambda_s$) and idler signal ($\lambda_i$) have been amplified relative to pump signal ($\lambda_p$). As shown, nonlinear medium 608-2 may perform non-degenerate single pump amplification, in which two photons from pump signal ($\lambda_p$) are removed and one photon for each of optical signal ($\lambda_s$) and idler signal ($\lambda_i$) are added. Then, optical bandpass filter 624 may selectively filter optical signal ($\lambda_s$) from signal profile 622-3 (also shown as 624-1) to isolate output signal ($\lambda_s$) 614, which has undergone phase-sensitive amplification with respect to input optical signal ($\lambda_s$) 604.

Referring now to FIG. 6B, a block diagram of selected elements of an embodiment of regenerator with PSA 330 is shown. Regenerator with PSA 330 may represent an embodiment of a phase-sensitive amplifier used with OSNR compensator 220 (see FIGS. 3C and 3D). It is noted that certain elements depicted in regenerator with PSA 330 in FIG. 6B may be modified, rearranged, and/or omitted, in various embodiments. In FIG. 6B, regenerator with PSA 330 is shown without certain optical elements for descriptive clarity. In various embodiments, regenerator with PSA 330 may exhibit an ultra-low noise figure (near 0 dBm fiber input power), may be capable of high gain with ultra-fast response without thermal effects, and therefore may be well suited to reduce phase and amplitude noise in very high bandwidth applications.

In FIG. 6B, input optical signal ($\lambda_s$) 604 may be split at optical splitter 634 and be routed to carrier phase recovery/pump phase locking 632 and optical combiner 635. At carrier phase recovery/pump phase locking 632, frequency and phase locking of pump laser ($\lambda_{p1}$) 630-1 and pump laser ($\lambda_{p2}$) 630-2 may be performed to generate pump 1 signal ($\lambda_{p1}$) and pump 2 signal ($\lambda_{p2}$) that are phase locked to optical signal ($\lambda_s$) and may serve in a degenerate amplifier configuration, such as a degenerate dual pump (2P) configuration, where two photons, one from each pump signal ($\lambda_{p1}$ and $\lambda_{p2}$), are removed and while two photons are added to the optical signal ($\lambda_s$). It is noted that carrier phase recovery/pump phase locking 632 may internally employ a nonlinear medium (not shown) to generate pump 1 signal ($\lambda_{p1}$) and pump 2 signal ($\lambda_{p2}$). Then, the two pump signals ($\lambda_{p1}$ and $\lambda_{p2}$) are combined with the optical signal ($\lambda_s$) at optical combiner 635. Next, EDFA 608 may amplify the combined signal to result in signal profile 636-1, in which the optical signal ($\lambda_s$) is relatively weak with respect to the two pump signals ($\lambda_{p1}$ and $\lambda_{p2}$). Then, the combined signal commensurate to signal profile 636-1 is introduced into nonlinear medium 638, where FWM occurs to result in signal profile 636-2, in which both amplitude and phase noise of the optical signal ($\lambda_s$) have effectively been suppressed. Then, optical bandpass filter 624 may selectively filter optical signal ($\lambda_s$) from signal profile 636-2 (also shown as 624-2) to isolate output signal ($\lambda_s$) 639, which has undergone phase and amplitude regeneration with respect to input optical signal ($\lambda_s$) 604.

Figure 7:
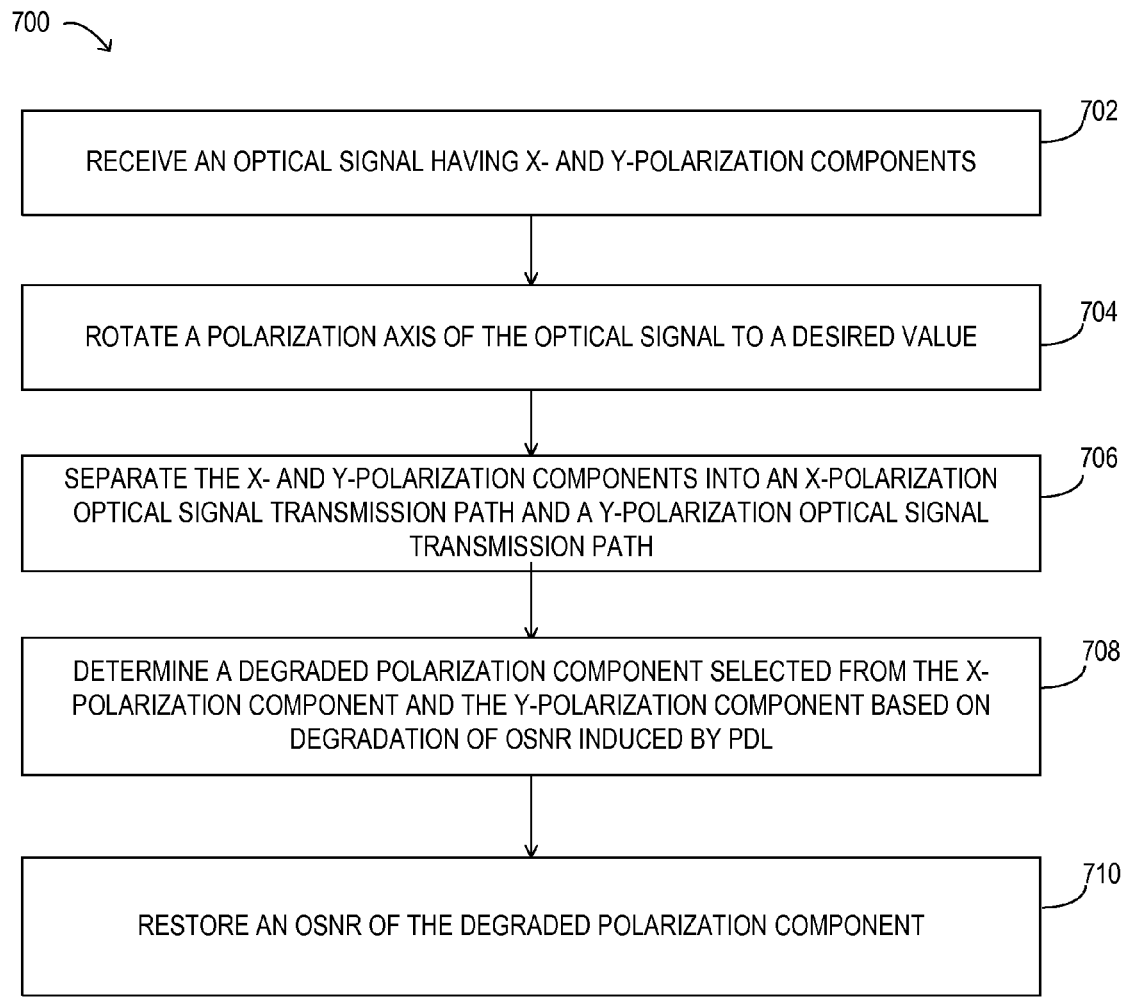
FIG. 7 is a flow diagram of selected elements of an embodiment of a method for compensating OSNR using an OSNR compensator.

Referring now to FIG. 7, a block diagram of selected elements of an embodiment of method 700 for asymmetrically compensating for PDL induced OSNR degradation in a dual-polarized optical signal is depicted in flowchart form. Method 700 may be performed using network 101 (see FIG. 1), for example, by using implementations described in FIGS. 4A-4E. It is noted that certain operations described in method 700 may be optional or may be rearranged in different embodiments.

In FIG. 7, method 700 may begin by receiving (operation 702) an optical signal having X- and Y-polarization components. A polarization axis of the optical signal may be rotated (operation 704) to a desired value. The X- and Y-polarization components may be separated (operation 706) into an X-polarization optical signal transmission path and a Y-polarization optical signal transmission path. A degraded polarization component selected from the X-polarization component and the Y-polarization component may be determined (operation 708) based on degradation of OSNR induced by PDL. An OSNR of the degraded component may be restored (operation 710).

Methods and systems for asymmetrically compensating degradation of an optical signal-to-noise ratio (OSNR) induced by polarization dependent loss (PDL) in dual-polarization optical system include using an OSNR compensator. The OSNR compensator may separate the dual-polarization components and determine which component has degraded OSNR. The degraded component may be OSNR compensated using a phase-sensitive amplifier.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for compensating optical signal-to-noise ratio (OSNR) degradation in an optical network, comprising:
   receiving an optical signal having dual-polarization comprising X- and Y-polarization components;
   rotating a polarization axis of the optical signal;
   separating the X- and Y-polarization components into an X-polarization optical signal transmission path and a Y-polarization optical signal transmission path;
   determining a degraded polarization component selected from the X-polarization component and the Y-polarization component based on degradation of an optical signal-to-noise ratio induced by polarization dependent loss; and
   restoring an optical signal-to-noise ratio of the degraded polarization component, including performing phase-sensitive amplification on the degraded polarization component.

2. The method of claim 1, further comprising:
   after restoring the optical signal-to-noise ratio, combining the X- and Y-polarization components.

3. The method of claim 1, wherein determining the degraded polarization component includes:
   monitoring a first optical signal-to-noise ratio at the X-polarization optical signal transmission path;
   monitoring a second optical signal-to-noise ratio at the Y-polarization optical signal transmission path; and
   selecting the degraded polarization component based on the first optical signal-to-noise ratio and the second optical signal-to-noise ratio.

4. The method of claim 3, wherein determining the degraded polarization component includes determining an undegraded polarization component selected from the X-polarization component and the Y-polarization component, wherein the undegraded polarization component is different from the degraded polarization component.

5. The method of claim 4, further comprising:
   amplifying the undegraded polarization component using an erbium-doped fiber amplifier.

6. The method of claim 1, further comprising:
   after restoring the optical signal-to-noise ratio, separately demodulating the X- and Y-polarization components to recover X-polarization data and Y-polarization data.

7. An optical signal-to-noise ratio compensator, comprising:
   a polarization controller for receiving a dual-polarized optical signal and rotating a state of polarization (SOP) of the dual-polarized optical signal;
   a polarization beam splitter for separating X- and Y-polarization components of the dual-polarized optical signal, respectively, along an X-polarization optical signal transmission path and a Y-polarization optical signal transmission path;
   two optical signal-to-noise monitors for respectively monitoring optical signal-to-noise ratios along the X-polarization optical signal transmission path and the Y-polarization optical signal transmission path; and
   a phase-sensitive amplifier for restoring an optical signal-to-noise ratio of a degraded polarization component selected from the X-polarization component and the Y-polarization component.

8. The optical signal-to-noise ratio compensator of claim 7, further comprising:
   two optical switching elements, one at each of the X-polarization optical signal transmission path and the Y-polarization optical signal transmission path, wherein the two optical switching elements selectively route a polarization component to the phase-sensitive amplifier.

9. The optical signal-to-noise ratio compensator of claim 8, wherein the two optical switching elements selectively route the polarization component to a pass-through path.

10. The optical signal-to-noise ratio compensator of claim 8, wherein the two signal-to-noise monitors cooperate to determine the degraded polarization component based on the optical signal-to-noise ratios along the X-polarization optical signal transmission path and the Y-polarization optical signal transmission path, wherein the degraded polarization component is selected as the polarization component having a lower optical signal-to-noise ratio.

11. The optical signal-to-noise ratio compensator of claim 10, wherein the two signal-to-noise monitors cooperate to control the two optical switching elements for each of the X-polarization optical signal transmission path and the Y-polarization optical signal transmission path.

12. The optical signal-to-noise ratio compensator of claim 7, further comprising:
   a polarization beam combiner for combining the X-polarization optical signal transmission path and the Y-polarization optical signal transmission path.

13. The optical signal-to-noise ratio compensator of claim 7, further comprising:
   a regenerator for restoring both amplitude and phase components of the dual-polarized optical signal, wherein the regenerator is included with the phase sensitive amplifier.

14. An optical communication system comprising:
   a transmitter that transmits a dual-polarized optical signal over an optical signal transmission path;
   a receiver that receives the dual-polarized optical signal from the optical signal transmission path; and
   at least one optical signal-to-noise ratio compensator, further comprising:
     a polarization controller for receiving the dual-polarized optical signal and rotating a state of polarization (SOP) of the dual-polarized optical signal;
     a polarization beam splitter for separating X- and Y-polarization components of the dual-polarized optical signal, respectively, along an X-polarization path and a Y-polarization path;

two optical signal-to-noise monitors for respectively monitoring optical signal-to-noise ratios along the X-polarization path and the Y-polarization path; and a phase-sensitive amplifier for restoring an optical signal-to-noise ratio of a degraded polarization component selected from the X-polarization component and the Y-polarization component.

15. The optical communication system of claim 14, wherein a first optical signal-to-noise ratio compensator receives a demultiplexed channel and outputs the demultiplexed channel to the receiver, and wherein at least one phase-sensitive amplifier is installed in the optical signal transmission path in place of an erbium-doped fiber amplifier.

16. The optical communication system of claim 14, further comprising:

an optical add/drop multiplexer (OADM) installed in the optical signal transmission path; and a second optical signal-to-noise ratio compensator linking the optical add/drop multiplexer to a secondary optical communication system.

17. The optical communication system of claim 14, further comprising:

an erbium-doped fiber amplifier (EDFA) installed in the optical signal transmission path; and a third optical signal-to-noise ratio compensator installed before the erbium-doped fiber amplifier in the optical signal transmission path.

18. The optical communication system of claim 14, wherein a fourth optical signal-to-noise ratio compensator includes an erbium-doped fiber amplifier (EDFA), and further comprising:

the fourth optical signal-to-noise ratio compensator installed in the optical signal transmission path.

19. The optical communication system of claim 14, wherein a fifth optical signal-to-noise ratio compensator is included in the receiver.

20. The optical communication system of claim 19, wherein a regenerator for restoring both amplitude and phase components of the dual-polarized optical signal is included with the phase sensitive amplifier.

21. The optical communication system of claim 14, wherein an optical signal-to-noise ratio compensator further comprises:

a polarization beam combiner for combining the X-polarization path and the Y-polarization path.

* * * * *